United States Patent

[11] 3,593,083

| [72] | Inventor | Felix Blaschke |
| | | Erlangen, Germany |
| [21] | Appl. No. | 816,959 |
| [22] | Filed | Apr. 17, 1969 |
| [45] | Patented | July 13, 1971 |
| [73] | Assignee | Siemens Aktiengesellschaft |
| | | Berlin and Munich, Germany |
| [32] | Priority | Apr. 18, 1968 |
| [33] | | Switzerland |
| [31] | | 5765/68 and 5766/68 |

[54] APPARATUS FOR PROVIDING THE PILOT VALUES OF CHARACTERISTICS OF AN ASYNCHRONOUS THREE PHASE MACHINE
13 Claims, 17 Drawing Figs.

[52] U.S. Cl. .......................................... 318/227, 318/230, 318/231
[51] Int. Cl. ........................................... H02p 5/40
[50] Field of Search ............................. 318/227—231

[56] References Cited
UNITED STATES PATENTS

| 3,343,063 | 9/1967 | Keeney | 318/231 X |
| 3,348,110 | 10/1967 | Koppelmann | 318/227 |
| 3,387,195 | 6/1968 | Piccand et al. | 318/227 |
| 3,427,526 | 2/1969 | Kernick | 318/230 X |

FOREIGN PATENTS

| 745,840 | 3/1956 | Great Britain | 318/231 |

*Primary Examiner*—Gene Z. Rubinson
*Attorneys*—Curt M. Avery, Arthur E. Wilfond, Herbert L. Lerner and Daniel J. Tick

ABSTRACT: Multipliers produce a signal having a magnitude proportional to the sum of the squares of the rotary flux vectors and the induced three phase voltage vector of an asynchronous three phase machine by first producing signals having instantaneous magnitudes proportional to flux components of voltages induced in two winding axes spaced from each other by 120°. The multipliers multiply each signal magnitude by itself as well as by the other. The resultant products are then algebraically added.

APPARATUS FOR PROVIDING THE PILOT VALUES OF CHARACTERISTICS OF AN ASYNCHRONOUS THREE PHASE MACHINE

DESCRIPTION OF THE INVENTION

The present invention relates to apparatus for providing the pilot values of characteristics of an asynchronous three-phase machine. More particularly, the invention relates to apparatus for providing the pilot values of of rotary speed, slip, torque and flux of an asynchronous three-phase machine.

The control of a converter-energized asynchronous three-phase machine with a minimum of losses, which has recently become more feasible, has created interest in the control of the pertinent magnitudes in an asynchronous machine. The pertinent magnitudes involve rotary speed, slip, torque and flux or electromotive phase. There is thus an increased interest in providing a drive which is comparable to the typical DC machine with respect to control technicalities. To accomplish this, appropriate pilot or actual values or magnitudes are required to provide the pertinent magnitudes. An object of the present invention is to provide complete control of the pertinent magnitudes without requiring rotating, electromechanical or galvanomagnetic pilot value indicators, as hereinbefore required.

In an arrangement utilized to maintain the maximum torque of an asynchronous motor energized by a voltage having a variable frequency, it is known to measure the voltage and current of a motor phase and to reproduce with the measured magnitudes the ohmic and inductive voltage drops in the primary circuit in order to provide in such a manner a magnitude proportional to the maximum torque of the motor. This arrangement has a disadvantage due to the fact that this type of measurement is supported only by the values or magnitudes of one phase. This may result in an accurate indication regarding the actual conditions only when there is complete phase symmetry. Furthermore, an accurate indication at any given instant, concerning the dynamic conditions during the transition from a stationary condition to another condition, is basically impossible when utilizing the known methods.

In contrast, the apparatus of the present invention provides the pilot or actual value for the control of a converter-energized asynchronous three-phase machine by utilizing the primary current and voltage of the converters utilized to measure the machine.

The principal object of the present invention is to provide new and improved apparatus for providing the pilot values of characteristics of an asynchronous three-phase machine.

An object of the present invention is to provide the pilot values of characteristics of an asynchronous three-phase machine from the primary current and voltage of converters utilized to measure the machine.

An object of the present invention is to provide apparatus for providing the pilot values of characteristics of an asynchronous three-phase machine with efficiency, effectiveness and reliability.

An object of the present invention is to provide apparatus for providing the pilot values of characteristics of an asynchronous three-phase machine without incurring the disadvantages of known methods.

In accordance with the present invention, in order to provide a magnitude which is proportional to the square of the magnitude of the rotary flux vector and/or the induced three-phase voltage vector, instantaneous magnitudes are formed which are proportional to flux components or induced voltage components occurring in two winding axes spaced from each other by 120°. This is accomplished by multipliers which multiply each magnitude by itself as well as by the other. The output magnitudes produced by the multipliers are added to each other by a summing device or component. Thus, in accordance with the present invention, the control magnitude for high quality control of an asynchronous three phase current machine is represented by a magnitude which depends upon the sum of the three phase flux vector or the electromotive force. All dynamic fluctuations of such magnitude are thereby measured, so that at any given instant an actual and accurate indication is provided.

Apparatus of relatively simple structure for providing the magnitude proportional to the sum of the three phase flux vector or the electromotive force comprises, in accordance with an embodiment of the present invention, two multipliers. Each of the multipliers has a first input and a second input. A magnitude proportional to one of the flux components is supplied to the first input of each of the two multipliers. A magnitude proportional to the sum of the first magnitude and to a magnitude proportional to the other of the flux components is supplied to the second inputs of both multipliers.

In accordance with another embodiment, a magnitude proportional to one of the flux components is supplied to both the first and second inputs of one of the multipliers and a magnitude proportional to the other of the flux components is supplied to both the first and second inputs of the other of the multipliers. This embodiment permits the utilization of square function generators as the multipliers. The square function generators comprise biased threshold diodes which permit a very accurate multiplication of the input to the multiplier by itself. The square function generators are simple to construct.

The magnitudes proportional to the phase flux components are preferably provided in a manner whereby one current converter is connected to at least two motor leads and the load of the converter comprises an ohmic and an inductive resistance connected in series circuit arrangement. Voltages proportional to the phase current and to the differential time quotients are derived from the load and supplied to an integrator together with the corresponding phase voltage. Since the provision of the magnitudes relates only to alternating current magnitudes, it may be expedient to provide a negative feedback between the integrator and a proportional amplifier, preferably having an integral portion, in order to suppress undesired and uncontrollable DC influences. The transmission properties of the apparatus are especially satisfactory if the quotient of a double integrating period of the integrator and the integral action time of the feedback integrator amplifier is selected to be equal to or smaller than the proportional amplification of the feedback amplifier and the proportional amplification itself is selected to be very small.

The torque indication is provided by supplying a magnitude proportional to the instantaneous magnitude of the secondary flux of one phase to the first inputs of the multipliers and supplying a magnitude proportional to the phase current of the other phase to the second inputs of said multipliers. The outputs of multipliers are then subtracted from each other in a summing device or components. The voltage thereby obtained may be utilized to provide a magnitude proportional to the slip frequency, if the output of the summing device is supplied as the dividend to one input of a divider and a magnitude proportional to the sum of the square of the secondary rotary flux is supplied to the other input of the divider as the divisor.

If the asynchronous machine is to be controlled for constant torque, for itself, or within a torque regulating circuit corresponding to a controlling regulator, then it is advantageous, in consideration of the slip pilot value, to provide a defined regulating or control direction or sense by releasing a specific or linear dependency between the torque and the slip. The torque pilot value specified for regulation or control is thus linearized. To accomplish this, and in accordance with another embodiment of the present invention, the output of the divider is supplied to a multiplier having supplied to its input a magnitude which is proportional to the square of the main rotary flux.

In accordance with the present invention, apparatus provides the pilot values of characteristics of an asynchronous three-phase machine from the primary current and voltage of converter means utilized to measure the machine. The apparatus comprises multiplying means having output means for producing a signal having a magnitude proportional to the sum of the squares of the rotary flux vectors and the induced three phase voltage vector by first producing signals having instantaneous magnitudes proportional to flux components of voltages induced in two winding axes spaced from each other by 120°. The multiplying means multiples each signal magnitude by itself as well as by the other. Summing means is connected to the output means of the multiplying means.

The multiplying means comprises a pair of multipliers each having a first input and a second input. First input means connected to the first inputs of the multipliers supplies a first signal having a magnitude proportional to one of the flux components. Second input means connected to the second inputs of the multipliers supplies a second signal having a magnitude proportional to the sum of the magnitude of the first signal and a magnitude proportional to the other of the flux components.

The multiplying means comprises a pair of parabolic multipliers each having a first input and a second input. Input means connected to the first and second inputs of one of said multipliers supplies a signal having a magnitude proportional to one of the flux components. Input means connected to the first and second inputs of the other of the multipliers supplies a signal having a magnitude proportional to the other of the flux components.

The summing means has an output connected to the input of a square root extracting function generator.

Current transformer means connected in at least two leads of the machine comprises a pair of current transformers each having a primary winding connected in a corresponding one of the leads of the machine and a secondary winding. An ohmic resistance and an inductive reactance are connected in series circuit arrangement across each of the secondary windings for providing voltages proportional to the phase current and its differential quotient. Coupling means applies the voltages and the subordinated phase voltage to integrator means to provide at the integrator means a magnitude proportional to the flux components. The integrator means comprises a pair of integrators each coupled to the secondary winding of a corresponding one of the current transformers. Each of the proportion amplifiers is connected across a corresponding one of the integrators in feedback relation for suppressing direct current. The quotient of the double integral time of the integrators and the integral time of the proportion amplifiers are equal to or less than the proportional amplification thereof. The proportional amplification is as small as possible.

The multiplying means comprises a pair of multipliers each having a first input and a second input and an output for producing a signal having a magnitude proportional to the instantaneous torque of the machine. A summing device is connected to the outputs of the multipliers for producing the difference of the outputs. Input means connected to the first inputs of the multipliers supplies to the first inputs the difference between instantaneous magnitudes of the secondary flux of the machine. Magnitudes proportional to the primary currents of two phases and input means connected to the second inputs of the multipliers supplies to the second inputs the sum of the primary current proportional magnitudes minus twice a magnitude proportional to the secondary flux or primary current of the third phase of the machine.

The multiplying means comprises a pair of multipliers each having a first input and a second input and an output providing a signal having a magnitude proportional to the instantaneous torque of the machine. Input means connected to the first inputs of the multipliers supplies to the first inputs a magnitude proportional to the instantaneous value of the secondary flux or the main flux of one phase. Input means connected to the second inputs of the multipliers supplies to the second inputs a magnitude proportional to the primary current of the other phase. A summing device connected to the outputs of the multipliers provides the difference between the output signals of the multipliers. Divider means having first and second inputs and an output provides a magnitude proportional to the slip frequency of the machine. The first input of the divider means is connected to the summing device for providing a dividend to the divider means. Additional input means connected to the second input of the divider means supplies to the divider means a divisor having a magnitude proportional to the sum of the squares of the secondary rotary flux of the machine.

The multiplying means comprises a pair of multipliers each having a first pair of inputs and a second pair of inputs and an output for providing a signal having a magnitude proportional to the instantaneous rotary speed of the machine. Input means connected to the first pair of inputs of the multipliers supplies to the first pair of inputs a magnitude proportional to the instantaneous magnitude of the secondary flux of one phase of the machine. Input means connected to the second pair of inputs of the multipliers supplies to the second pair of inputs a magnitude proportional to the derivatives of the other phases of the machine relative to time. A summary device is connected to the output of one of the multipliers via a first amplifier and is connected to the output of the other of the multipliers via a second amplifier in a manner whereby the outputs of the multipliers are subtractively supplied to the summing device and a magnitude proportional to the torque of the machine is supplied to the summing device. The output of the summing device is directly connected to the first input of the divider for supplying the dividend to the divider. Additional input means connected to the second input of the divider supplies to the divider a divisor having a magnitude proportional to the sum of the squares of the secondary rotary flux of the machine.

Each of the multipliers may comprise a square function generator having a plurality of biased threshold diodes.

An additional multiplier having first and second inputs and an output produces a magnitude proportional to the torque of the machine. The output of the divider means is connected to the first input of the additional multiplier. Further input means connected to the second input of the additional multiplier supplies to the additional multiplier a signal having a magnitude proportional to the sum of the squares of the main rotary flux of the machine.

In order that the present invention may be readily carried into effect, it will now be described with reference to the accompanying drawings, wherein.

Figure 1:
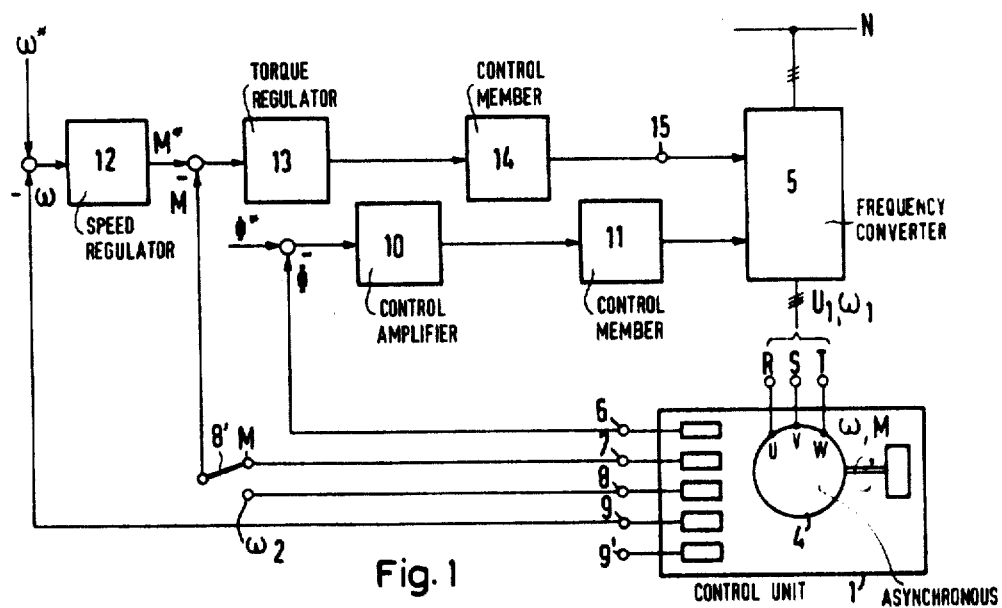
FIG. 1 is a schematic block diagram of an embodiment of the apparatus of the present invention for controlling the rotary speed of an asynchronous machine.

FIG. 1 illustrates rotary speed regulating or controlling apparatus in accordance with the present invention. In FIG. 1, a control unit 1 comprises an asynchronous machine 4. The asynchronous machine 4 is mechanically coupled to a load, which is not illustrated in the figure, in order to maintain the clarity of illustration. The asynchronous machine 4 has stator terminals U, V and W which are energized by a frequency converter 5 via output terminals R, S and T of said frequency converter. The frequency converter 5 is energized via a three-phase power supply system generally indicated by the single line N.

The output frequency ω, of the intermediate frequency converter 5 may be widely varied in a known manner at a control input loaded with a direct voltage of appropriate magnitude. Thereby, at the same time, another control input must insure that the output voltage $U_1$ of the converter 5 is adjusted or regulated in a manner whereby the airgap flux of the asynchronous machine 4 remains constant. A separate flux regulating circuit is utilized to accomplish this. A magnitude derived from the output terminal 6 of the control unit 1, which is proportional to the airgap flux Φ of the asynchronous machine 4, is compared with a flux reference or datum magnitude Φ⁻ in the flux regulating circuit.

The difference between the fluxes provided by the flux regulating circuit is supplied to a control amplifier 10. The control amplifier 10 provides, via a control member 11, a subordinated control input of the frequency converter 5 by varying the output voltage of said frequency converter for a period of time until there is uniformity or consistency between the desired flux datum or reference magnitude Φ⁻ and the actual or pilot flux magnitude Φ of the asynchronous machine 4. A speed regulator 12 processes the difference between a speed datum or reference magnitude ω⁻ and the actual or pilot magnitude ω of the speed derived from output terminal 9 of the control unit 1. The speed regulator 12 provides a reference or datum magnitude M⁻ of the torque which is compared with a pilot or actual magnitude M of the torque provided at the output terminal 7 of the control unit 1. The comparison result is supplied to a subordinated torque regulator 13.

Instead of subordinating a torque regulator to the speed regulator, it is sometimes preferable to utilize the torque slip $ω_2$ as a subordinated auxiliary control magnitude. In this event, the pilot magnitude input to the subordinated torque regulator 13 is derived from the output terminal 8 of the control unit 1 via a switch arm 8'. The output of the torque regulator 13, which is subordinated to the speed regulator 12, controls, via a control member 14, the frequency control input 15 of the frequency converter 5 for a period of time which continues until there is uniformity or consistency between the desired datum magnitude ω⁻ of the speed and the pilot magnitude ω of the speed.

In known arrangements, suitable special components for producing pilot magnitudes had to be provided to supply the terminals 6 to 9 of the control unit 1 with appropriate pilot magnitudes of flux, torque, rotor slip and rotary speed. Thus, for example, a tachometer was utilized for the pilot magnitude ω of the speed and galvanomagnetic measuring units such as, for example, Hall generators, were utilized to provide the pilot magnitudes Φ and M of magnetic flux and torque, respectively. The apparatus of the present invention, however, provides the pilot magnitudes for high quality control without contacts, without moving parts, and only by utilization of the primary electrical input magnitudes of an asynchronous machine.

Figure 2:
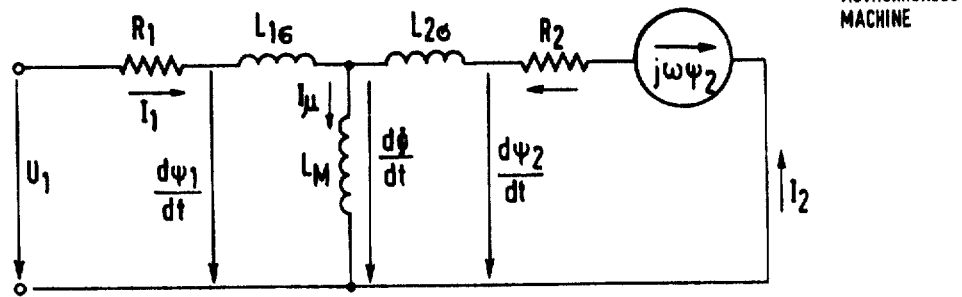
FIG. 2 is an equivalent circuit diagram of the apparatus of FIG. 1.

FIG. 2 assists in explaining the basic principles of the apparatus of the present invention for providing the pilot values of characteristics of an asynchronous three-phase machine. FIG. 2 illustrates the relationship between the individual rotary rectors of the stator and rotor voltages, currents and fluxes. The circuit diagram of FIG. 2 is a coordinate system which is stator oriented, that is it is positioned relative to the stator. The primary magnitudes occurring at the stator are indicated by the numeral 1 and the secondary magnitudes occurring at the rotor are indicated by the numeral 2.

In FIG. 2, the stator voltage vector is $U_1$, the primary ohmic resistance is $R_1$, the secondary ohmic resistance is $R_2$, the primary control inductivity is $L_{1σ}$, the secondary control inductivity is $L_{2σ}$, the main inductivity is $L_M$, the stator flux vector is $ψ_1$, the rotor flux vector is $ψ_2$, and the main flux vector is Φ. The induced three-phase voltage vector of the electromotive force is EMK.

The electrical torque may be illustrated as a vectorial product of the rotor flux vector and the stator current vector, so that $$M \sim ψ_2 I_1$$

In addition to the equations set forth in FIG. 2, the equation for the slip frequency is $$ω_2 = ω_1 - ω$$

Also, the following relationships are in effect:

$$K = (L_M + L_2σ)/L_M$$
$$L_e = L_{1σ} + L_2σ/K$$

Figure 3:
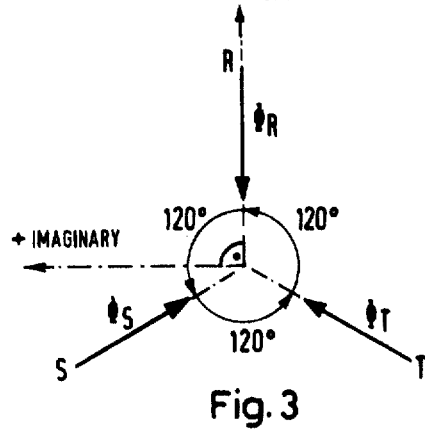
FIG. 3 illustrates the rotary flux vectors of the machine.

In multiphase AC machines, the rotary vectors of the voltages, currents and fluxes may be indicated by the instantaneous magnitudes of their components occurring in the individual phase windings, since such rotary vectors result from geometrical additions of their instantaneous magnitudes occurring in individual axes of the machine. If, as shown in the vector diagram of FIG. 3, which is an example of a rotary flux vector Φ, the origin of a complex coordinate system is the rotary axis of a three-phase rotary field machine and its real axis is that of the winding axis R, the rotary flux vector Φ may be indicated at any instant by the equation $$Φ = Φ_R - ½(Φ_S + Φ_T) + j(√3/2)(Φ_S - Φ_T) \quad (1)$$

wherein $Φ_R$, $Φ_S$, and $Φ_T$ indicate the instantaneous magnitudes of the individual phase magnitudes.

Figure 4:
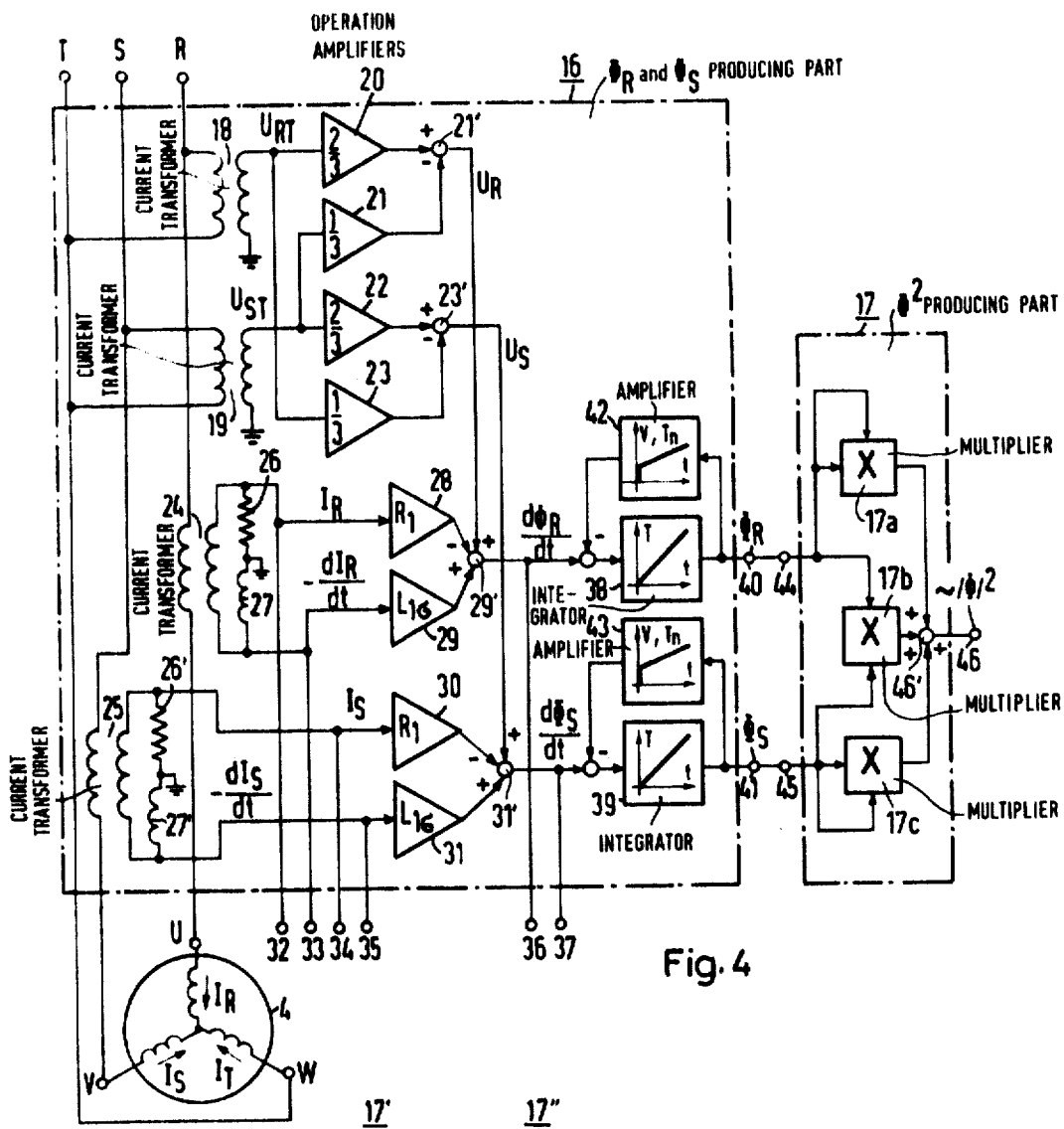
FIG. 4 is a block diagram of apparatus of the present invention which indicates a magnitude proportional to the square of the sum of the rotary flux vector.

FIG. 4 is a block diagram of apparatus which indicates a magnitude proportional t4 the square of the sum of the rotary flux vector as an output magnitude for the production of pilot or actual magnitudes required for controlling an asynchronous three-phase machine. The apparatus of FIG. 4 operates on the principle that in a three-phase system, which is free from zero components, the sum of the instantaneous magnitudes in the individual phases is always equal to zero. Thus, only the instantaneous magnitudes of two phases need be considered in providing the sum of the three-phase flux vector. The apparatus illustrated in FIG. 4 is divided into two principal parts 16 and 17. The first part 16 derives the instantaneous magnitudes of the fluxes occurring in phases R and S from the primary magnitudes of the asynchronous machine.

Since, as a rule, the neutral point of the asynchronous machine is not readily or easily accessible or available, two current transformers or converters 18 and 19 are connected with their primaries connected to the phases R and T and the phases S and T. The secondary windings of the current transformers 18 and 19 produce output voltages $U_{RT}$ and $U_{ST}$ which are supplied to operation amplifiers 20, 21, 22 and 23. Each of the operation amplifiers 20 to 23 indicates its amplification factor in the symbol representing said amplifier. The output voltages of the operation amplifiers 20 and 21 are supplied to a summing device 21'. The output voltages of the operation amplifiers 22 and 23 are supplied to a summing device 23'.

Each of the summing devices 21' and 23' functions to add the signals applied thereto in accordance with the polarities indicated, so that the resultant magnitudes provided by said summing devices correspond to the phase voltages $U_R$ and $U_S$, respectively.

In order to produce magnitudes corresponding to the phase currents as well as their derivatives relative to time, two current transformers or converters 24 and 25 are connected in the leads of the machine representing the phases U and V. An ohmic resistor 26 and an inductance 27 are connected in series circuit arrangement across the secondary winding of the current transformer 24. An ohmic resistor 26' and an inductor 27' are connected in series circuit arrangement across the secondary winding of the current transformer 25. A common point in the connection between the resistor and the inductor of each of the transformers 24 and 25 is connected to a point at ground potential.

Since each of the series circuit arrangements 26, 27 and 26', 27' is connected at its common point to ground, the voltage, which drops toward ground at the resistor 26 and at the resistor 26', may, thus, be utilized as an indication of the phase current corresponding to the voltage of the corresponding inductor 27 and 27' relative to ground. The voltage at each resistor 26 and 26' then corresponds to the negative magnitude of the derivative, relative to time, of the corresponding phase current.

Each end of the secondary winding of the current transformer 24 is connected to the input of a corresponding operation amplifier 28 and 29 and to a corresponding one of output terminals 32 and 33. Each end of the secondary winding of the transformer 25 is connected to a corresponding one of operation amplifiers 30 and 31 and to a corresponding one of output terminals 34 and 35. The outputs of the amplifiers 28 and 29 are added to each other and to the resultant magnitude provided by the summing device 21' in a summing device 29'. The outputs of the amplifiers 30 and 31 are added to each other and to the resultant magnitude provided by the summing device 23' in a summing device 31'. As indicated in FIG. 2, the voltage provided at output terminals 36 and 37 of FIG. 4 is proportional to the time derivative of the instantaneous magnitudes of the phase fluxes $\Phi_R$ and $\Phi_S$.

The voltages provided at the output terminals 36 and 37 are also applied to an integrator 38 and an integrator 39, respectively. Thus, the instantaneous magnitudes of the phase fluxes $\Phi_R$ and $\Phi_S$ are provided at output terminals 40 and 41 of the circuit 16. Since these instantaneous magnitudes are true alternating quantities relative to time, but have a tendency, as electronic circuits, toward zero point displacement caused by drift appearances and resulting in false DC portions, the integrators 38 and 39 include feedback couplings via amplifiers 42 and 43, respectively. Each of the amplifiers 42 and 43 is a proportional amplifier having an integral operation and is known as a PI amplifier. The aforementioned portion of DC may thus be effectively suppressed.

If T indicates the integral time of the integrators 38 and 39, $T_n$ indicates the integral operating time and V indicates the proportional amplification of the PI amplifiers 42 and 43, favorable conditions may be obtained relative to the dynamic transmission properties of the entire apparatus if the following equation is adhered to:

$$\frac{2T}{T_n} \leq V$$

The proportional amplification itself is thereby selected as small as possible.

The instantaneous magnitudes of the phase fluxes $\Phi_R$ and $\Phi_S$ are supplied to input terminals 44 and 45, respectively, of the circuit part 17 which derives therefrom a magnitude proportional to the sum of the squares of the rotary flux vector $\Phi$ occurring in the asynchronous machine 4. Each instantaneous magnitude is multiplied by itself to form a product and each of the instantaneous magnitudes is multiplied by the other, in addition. The products are added to each other. In order to accomplish this, the circuit 17 comprises three multipliers 17a, 17b and 17c and a summing device 46'. The circuit 17 produces at an output terminal 46 connected to the output of the summing device 46' a voltage which, with the exception of one constant factor, corresponds to the sum of the squares of the rotary flux vector $\Phi$.

Figures 4A, 4B:
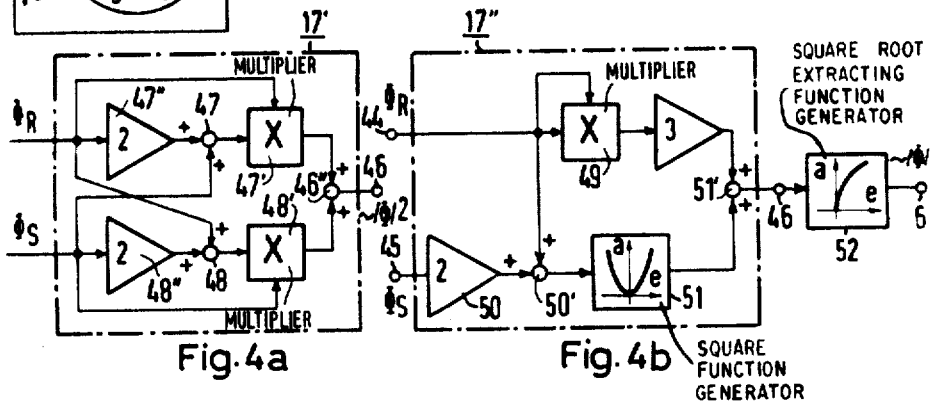
FIG. 4a is a block diagram of another embodiment of the circuit arrangement 17 of the apparatus of FIG. 4.
FIG. 4b is still another embodiment of the circuit arrangement 17 of the apparatus of FIG. 4.

FIG. 4a shows another embodiment of the circuit 17 for producing the sum of the squares of the rotary flux vector $\Phi$ from the instantaneous magnitudes of two of its phases. The circuit 17' of FIG. 4a comprises two summing devices 47 and 48 and two multipliers 47' and 48'. One phase magnitude is supplied directly and the other phase magnitude is supplied in twice amplified form. The output of the summing device 47 is supplied to the multiplier 47' and the output of the summing device 48 is supplied to the multiplier 48'. The input $\Phi_R$ is supplied directly to the multiplier 47', directly to the summing device 48 and to the summing device 47 after amplification in an amplifier 47''. The input code 12 is supplied directly to the multiplier 48', directly to the summing device 47 and to the summing device 48 via an amplifier 48''.

The outputs of the multipliers 47' and 48' are added in a summing device 46'', which provides a resultant magnitude at the output terminal 46, as in FIG. 4, which is proportional to the sum of the squares of the rotary flux vector. The advantage of the embodiment of FIG. 4a over that of FIG. 4 is that the circuit FIG. 4a requires only two multipliers compared to the three required by FIG. 4.

The type of multiplier circuit utilized in the circuit 17 is arbitrary. Thus, for example, known time base multipliers may be utilized. Multipliers utilizing Hall generators, known as parabolic multipliers, may also be utilized. Parabolic multipliers have a relatively simple design and may comprise two square function generators having inputs which alternately receive the sum and the difference of two magnitudes. The outputs of the square function generators are subtracted from each other to provide a magnitude which is proportional to the product of both input magnitudes. Square function generators comprise a number of parallel-connected threshold diodes, biased at different voltages. When parabolic multipliers are utilized, one of the two function generators becomes superfluous if both inputs to the multiplier have the same magnitude. This leads to the embodiment of FIG. 4b. Time base multipliers and parabolic multipliers multiply two magnitudes in entirely different manners.

The embodiment of FIG. 4b is another embodiment of the circuit 17 of FIG. 4. The circuit 17'' of FIG. 4b directly applies an input supplied to the input terminal 44 to both inputs of a multiplier 49. The input supplied to the input terminal 44 is also supplied to a summing device 50'. The multiplier 49 thus functions to provide the square of the input supplied to the terminal 44. The phase value supplied to the input terminal 45 is amplified by an amplifier 50 and supplied to the summing device 50'. The amplifier 50 is an operation amplifier having the magnification indicated in the symbol therefor. The output of the summing device 50' is supplied to the input of a square function generator 51. The symbol representing the square function generator 51 includes a graphical presentation of the function $a=e^2$. This is the relation between the output magnitude $a$ and the input magnitude $e$ of the square function generator 51.

The output signals of the multiplier 49 and the square function generator 51 are added with variable weights by a summing device 51' and are supplied to the output terminal 46, as in FIGS. 4a and 4. The output at the output terminal 46 is proportional to the sum of the squares of the three-phase flux vector $\Phi$.

In the embodiment of FIG. 4b, the multiplier 49 may comprise a square function generator corresponding to the square function generator 51. This results in the saving of two square function generators when parabolic multipliers are utilized, as aforedescribed, in FIG. 4b as compared to 4a. The signal at the output terminal 46 of the circuit 17'' may be supplied to a square root extracting function generator 52 to provide at the output terminal 6 thereof a signal proportional to the sum of the three-phase flux vector $\Phi$. The symbol representing the square root extracting function generator 52 includes the function $a=\sqrt{e}$. This function is the characteristic function of the output voltage $a$ and the input voltage $e$. As indicated in FIG. 1, the magnitude provided at the output terminal 6 of FIG. 4b is the actual or pilot magnitude which may be utilized in a flux regulating or controlling circuit.

It is important that the flux magnitude provided at the output terminal 6 of FIG. 4b follows, without delay, each variation in the sum of the three-phase flux vector, and thus supplies at any time, a dynamically correct reproduction of the machine flux. The circuit arrangements 17 of FIGS. 4, 4a and 4b may also readily be utilized to determine the sum of any other rotary three-phase vector occurring within the asynchronous machine or within any other three-phase system such as, for example, the three-phase voltage vector of the electromotive force, hereinafter described in greater detail. In sinusoidal-phase voltages, the magnitude provided at the output terminal 6 has a fixed relationship to the amplitude of the three-phase voltages applied to the input terminals 44 and 45. Since the output signal at the output terminal 6 of FIG. 4b is always unipolar, however, the circuit 17″ provides, for the first time, an opportunity to reproduce the amplitude of an alternating voltage, occurring in many p'...ses, as a proportional direct voltage, and to dynamically correct such voltage without delay. This problem could be solved only partly by the known DC circuits, due to the fact that the required smoothing components naturally act against a nondelayed reproduction of amplitude changes in the alternating measuring voltage. This is hereinafter discussed in greater detail.

Figure 5:
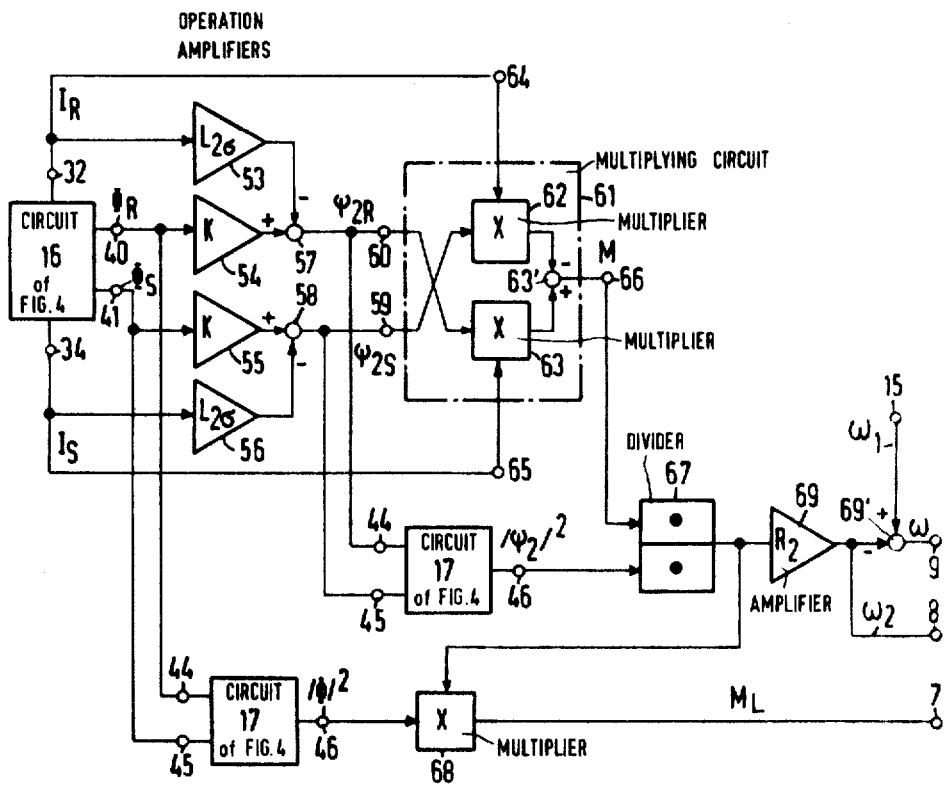
FIG. 5 is a block diagram of a circuit of the present invention for providing pilot magnitudes for the torque, rotary speed and rotor slip required to control the apparatus of FIG. 1.

FIG. 5 is a block diagram of a circuit for providing pilot or actual values required to control the apparatus of FIG. 1. The circuit of FIG. 5 provides pilot magnitudes for the torque, the rotary speed and the rotor slip. The phase magnitudes $\Phi_R$ and $\Phi_S$ of the main flux provided at the output terminals 40 and 41 of the circuit 16 of FIG. 4 are supplied to operation amplifiers 53, 54, 55 and 56. The outputs of the operation amplifiers 53 and 54 are supplied to a summing device 53 and the outputs of the operation amplifiers 55 and 56 are supplied to a summing device 58. The summing devices 57 and 58 provide the phase values of the rotor flux $\psi_{2R}$ and $\psi_{2S}$ in accordance with equation derived from FIG. 2.

The voltages corresponding to the rotor flux phase magnitudes $\psi_{2R}$ and $\psi_{2S}$ are applied to input terminals 59 and 56 of a multiplying circuit 61. The multiplying circuit 61 functions to indicate the torque as a vectorial product of the rotor flux $\psi_2$ and the stator current $I_1$. The torque M was found to be proportional to $$\psi_{2R} J_S - \psi_{2S} J_R$$

The multiplying circuit 61 comprises two multipliers 62 and 63. The input terminal 59 is directly connected to the multiplier 62 and the input terminal 60 is directly connected to the multiplier 63. An input terminal 64 is connected directly to the multiplier 62 and an input terminal 65 is connected directly to the multiplier 63. The input terminal 64 is a direct extension of the output terminal 32 of FIG. 4 and the input terminal 65 is a direct extension of the output terminal 34 of FIG. 4, so that the corresponding inputs of the multipliers 62 and 63 are supplied with magnitudes corresponding to the instantaneous magnitudes of phase currents $J_R$ and $J_S$. The outputs of the multipliers 62 and 63 are supplied to a summing device 63′ which subtracts them from each other and the resultant magnitude is provided at an output terminal 66. The resultant output signal at the output terminal 66 has a magnitude M proportional to the torque.

Figure 6:
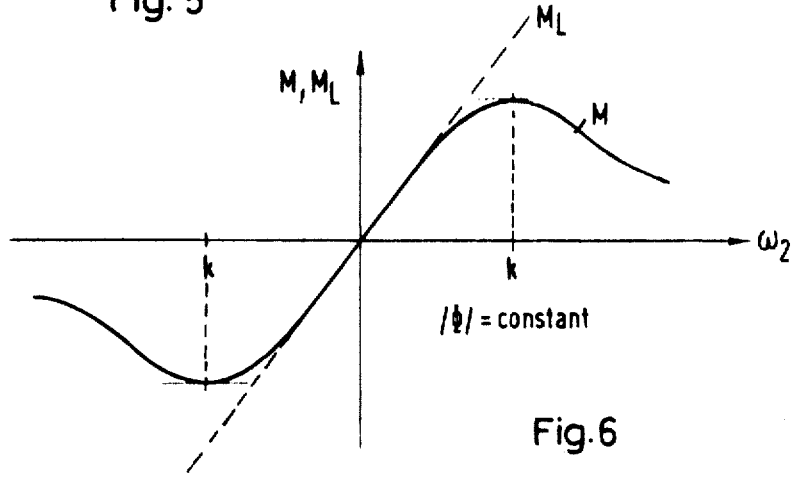
FIG. 6 is a graphical presentation of the curve of the torque M.

FIG. 6 is a graphical presentation of the curve of the torque M at a constant flux depending upon the stationary slip magnitudes $\omega_2$. The torque curve M satisfies the equation $$M = \left[\frac{\omega_2}{R_3}\right] \frac{\phi^2}{1 + (\omega_2 L_2 \sigma / R_2)^2}$$

The torque of the machine decreases beyond the breakdown slip magnitudes $k$. The torque magnitude M is utilizable as a pilot magnitude in a torque control circuit if special precautions are taken so that the variation of the torque curve on the other side of the breakdown slip magnitudes $k$ is prevented from reversing the control direction or sense. Such a reversal of direction or sense would cause erroneous operation of the speed control drive. It is preferable and simpler to linearize the torque curve M by a linear function corresponding to the straight line portion $M_L$ of the torque curve M of FIG. 6. The slope of the linear portion $M_L$ is provided as tangential to the torque curve M through the origin of the coordinate system of FIG. 6. The following equation applies relative to the sum of the squares of the main flux vector and the rotor flux vector $$\Phi^2/\psi_2^2 = 1 + (\omega_2 L_2 \sigma / R_2)^2$$

and, therefore, the linear portion $M_L$ may be provided in accordance with the equation $$M_L = M(\Phi^2/\psi_2^2) = (\Phi^2/R_2)\omega_2$$

In the circuit of FIG. 5, the last equation is realized by providing, from the phase magnitudes $\Phi_R$ and $\Phi_S$ of the main flux, in the aforedescribed manner utilizing the circuit arrangement 17, a magnitude proportional to the sum of the squares of the main flux vector $\Phi$. Analogously thereto, another magnitude is obtained by utilizing the circuit arrangement 17 of FIG. 4, which magnitude is proportional to the sum of the squares of the rotor flux vector. The magnitude is then supplied as a divisor to a divider 67. The output terminal 66 of the multiplying circuit 61 is connected to the other input of the divider 67. The output of the divider 67 is supplied to a multiplier 68 which multiplies the quotient produced by said divider with the output signal of the input terminal 46. The output signal at the output terminal 46 is proportional to the sum of the squares of the main flux vector. Thus, the magnitude of the output signal provided at the output terminal 7 corresponds to the torque $M_L$, which is linearized in the above described manner, and which may be utilized in accordance with FIG. 1 in a torque regulating or control circuit.

The quotient provided by the divider 67 is amplified by an amplifier 69 and is provided as a magnitude proportional to the slip $\omega_2$ at the output terminal 8. The output signal at the output terminal 8 may, as shown in FIG. 1, be selectively utilized within the control circuit. The output signal of the amplifier 69 is also supplied to a summing device 69′. A magnitude proportional to the primary frequency $\omega_1$ is also supplied to the summing device 69′ via the input terminal 15. The summing device 69′ produces a resultant magnitude proportional to the rotor speed $\omega$. The resultant magnitude $\omega$ is provided at the output terminal 9 and functions as the pilot or actual value for the speed regulating or control circuit.

Figure 7:
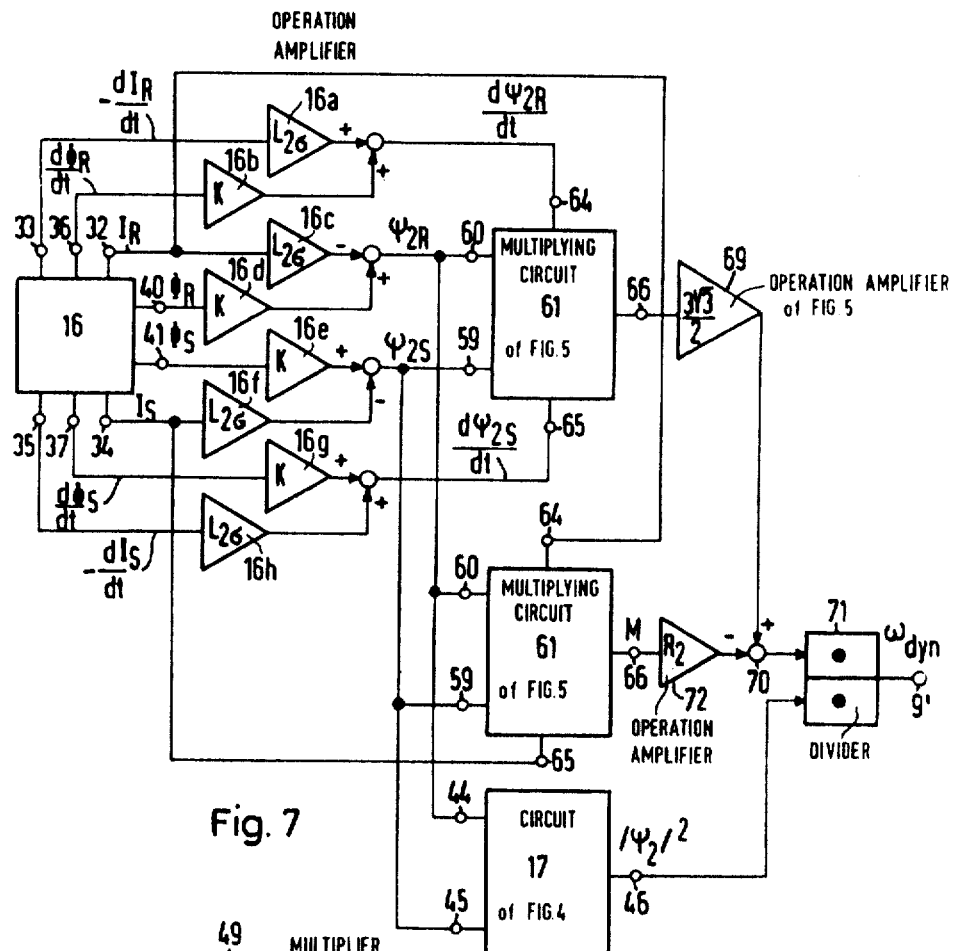
FIG. 7 is a block diagram of a circuit arrangement of the present invention for providing a dynamic speed pilot magnitude.

The reproduction of the pilot magnitudes $\omega_2$ and $\omega$ by the circuit arrangement of FIG. 5 is exact only for stationary or natural operating conditions. For a particularly high quality control, it may be necessary to utilize a pilot or actual value for the speed which corresponds to the instantaneous speed even during a transition from one rotor speed to another. FIG. 7 is a block diagram of a circuit arrangement for providing a dynamic speed pilot magnitude of such type. The embodiment of FIG. 7 is based upon the conversion thereby of the voltage vector equation of the secondary circuit derived from the equivalent circuit of FIG. 2 into a scalar relation and thereby the obtaining of a scalar magnitude for the rotary speed $\omega$ of the rotor by multiplying the equation vectorially with the vector $\psi_2$. The following scalar equation for the rotary speed of the rotor is then $$\omega = \frac{1}{\psi_2^2}\left[\frac{3\sqrt{3}}{2}\left(\psi_{2R}\frac{d\psi_{2S}}{dt} - \psi_{2S}\frac{d\psi_{2R}}{dt}\right) - MR_2\right]$$

The circuit arrangement of FIG. 7 includes the circuit 16 of FIG. 4. The output terminal 33 of the circuit 16 is connected to an operation amplifier 16a, the output terminal 36 of said circuit is connected to an operation amplifier 16b, the output terminal 32 of said circuit is connected to an operation amplifier 16c, the output terminal 40 of said circuit is connected to an operation amplifier 16d, the output terminal 41 of said circuit is connected to an operation amplifier 16e, the output terminal 34 of said circuit is connected to an operation amplifier 16f, the output terminal 37 of said circuit is connected to an operation amplifier 16g and the output terminal 35 of said circuit is connected to an operation amplifier 16h. The operation amplifiers 16a to 16h have amplification factors of K or $L_2$ so that analogously to FIG. 5, the magnitudes $\psi_{2R}$ and $\psi_{2S}$, as well as their derivatives relative to time, are provided. In the same manner, as shown in FIG. 5, a magnitude is provided proportional to the torque M and such magnitude is supplied to a summing device 70 via an operation amplifier 72 which has an amplification factor of $R_2$.

Analogously to FIG. 5, the vector product $$\psi_2(d\psi_2/dt)$$

is provided in the multiplying circuit 61 of FIG. 5, with the assistance of the operation amplifier 69 of FIG. 5. The operation amplifier 69 has an amplification factor of $3\sqrt{3}/2$. The outputs of the operation amplifiers 69 and 72 are supplied to the summing device 70. The output of the summing device 70 is supplied as the divisor to the input of a divider 71. A magnitude proportional to the sum of the squares of the rotor flux $\psi_2$ is provided in the aforedescribed manner by the circuit arrangement 17 of FIG. 4 and is supplied to the other input of the divider 71. The divider 71 thus provides an output quotient having a magnitude $\omega_{dyn}$ which exactly reproduces the dynamic speed pilot magnitude of the rotor of the machine. The output signal is provided at the output terminal 9'.

Figure 8:
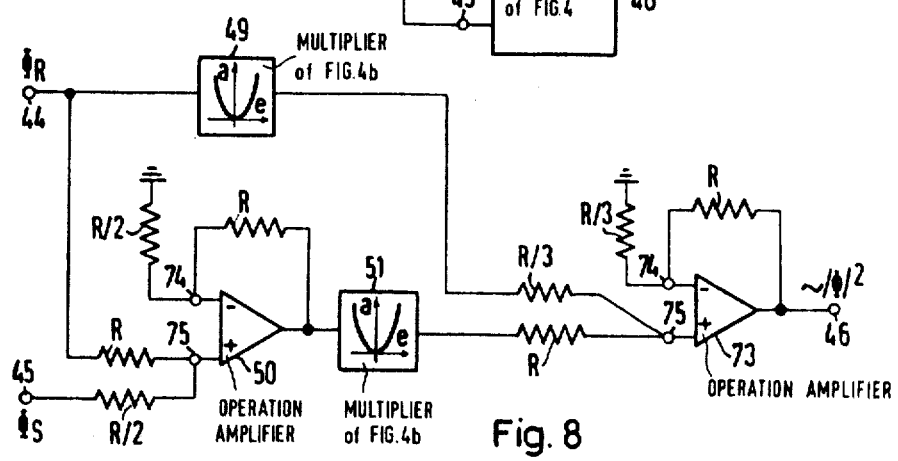
FIG. 8 is a block diagram of an embodiment of a circuit corresponding to that of FIG. 4b.

FIG. 8 is a circuit arrangement corresponding to the circuit arrangement 17" of FIG. 4b and indicates how the summing device may be combined with the operation amplifiers connected thereto. In FIG. 8, the operation amplifier 50 and an operation amplifier 73 are symmetrically different amplifiers having high no-load amplification factors. That is, in order to provide complete control they require, in unloaded condition, a very low input current and very low input voltages. When there is no difference in potential at input terminals 74 and 75 of the operation amplifier 50, the output of the operation amplifiers 50 and 73 is at ground or reference potential.

A positive voltage, indicated by a negative polarity sign, supplied to the input 74, shifts the potential of the output in a negative direction, and a positive input voltage, identified by a positive polarity sign, applied to the input 75, shifts the output potential of the operation amplifiers 50 and 73 in a positive direction. The reverse applies for negative input voltages. If care is taken that the parallel connection of all resistors connected with the input terminal 74 have the same total resistance as the parallel connection of all resistors connected to the input terminal 75, the output voltage of the operation amplifiers 50 and 73 comprises individual voltage portions provided with one energizing input voltage. The magnitude of the individual voltage portions occurs as a product of the energizing input voltage and the ratio of a feedback resistor R and the input resistance connected between the energizing input voltage in the input terminal 74 or 75. These conditions and the magnitudes indicated in FIG. 8 for the input resistances, result in a magnitude of $$2\Phi + \Phi_R$$

for the output voltage of the operation amplifier 50. The output voltage at the output terminal 46 of the operation amplifier 73 accordingly comprises the triple output voltage of the square function generator 49 of FIG. 4b and the simple output voltage of the multiplier 51 of FIG. 4b.

The embodiments thus far described indicate pilot magnitude providing circuits utilizing instantaneous magnitudes of only two phases. Such circuits are preferably always utilized when the three-phase system is free from zero components and the sum of the instantaneous values of the individual phase magnitudes is always equal to zero. If this condition does not apply to certain three-phase systems, the illustrated embodiments may be readily modified to three-phase and multiphase measuring and processing for the individual phase values.

In order to modify the circuit part 16 of the embodiment of FIG. 4 to three-phase operation, it is only necessary, for example, to provide an additional current transformer in the lead to the machine phase W, as well as additional operation amplifiers such as the operation amplifiers 28, 29 or 30, 31 of FIG. 4, which are connected to said current transformer, in order to provide a magnitude which is proportional to the phase flux magnitude $\Phi_T$.

Figure 9:
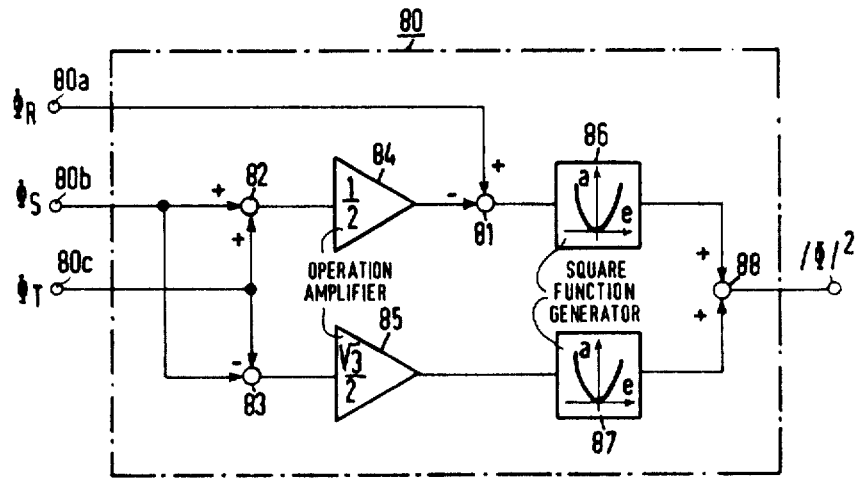
FIG. 9 is a block diagram of the three phase analogous circuit of the circuit arrangement 17 of the apparatus of FIG. 4.

FIG. 9 is a block diagram of the three-phase analogous circuit of the circuit 17 of the embodiment of FIG. 4. The circuit of FIG. 9 provides a magnitude proportional to the sum of the squares of the rotary flux vector $\Phi$. In accordance with the first indicated equation, the phase flux values $\Phi_R$, $\Phi_S$ and $\Phi_T$ are supplied to input terminals 80a, 80b and 80c, respectively. The input terminal 80a is directly connected to a summing device 81. The input terminal 80b is directly connected to a summing device 82 and is directly connected to a summing device 83. The input terminal 80c is directly connected to each of the summing devices 82 and 83.

The resultant magnitude provided by the summing device 82 is supplied to the summing device 81 after amplification by an operation amplifier 84. The resultant magnitude provided by the summing device 83 is amplified by an operation amplifier 85. The amplification factor of the operation amplifier 84 is one half and the amplification factor of the operation amplifier 85 is $\sqrt{3}/2$. The magnitude provided by the summing device 81 is supplied to a multiplier 86 which comprises a square function generator. The output signal of the operation amplifier 85 is supplied to a multiplier 87 which comprises a square function generator. The outputs of the multipliers 86 and 87 are supplied to a summing device 88 which provides an output signal having a magnitude proportional to the sum of the squares of the three-phase flux vector $\Phi$ in accordance with the equation $$\Phi^2 = \Phi_R^2 + \Phi_S^2 + \Phi_T^2 - \Phi_R\Phi_S - \Phi_R\Phi_T - \Phi_S\Phi_T$$

A magnitude proportional to the sum of the squares of the secondary rotary flux vector $\psi_2$ may be provided in basically the same manner.

Figure 10:
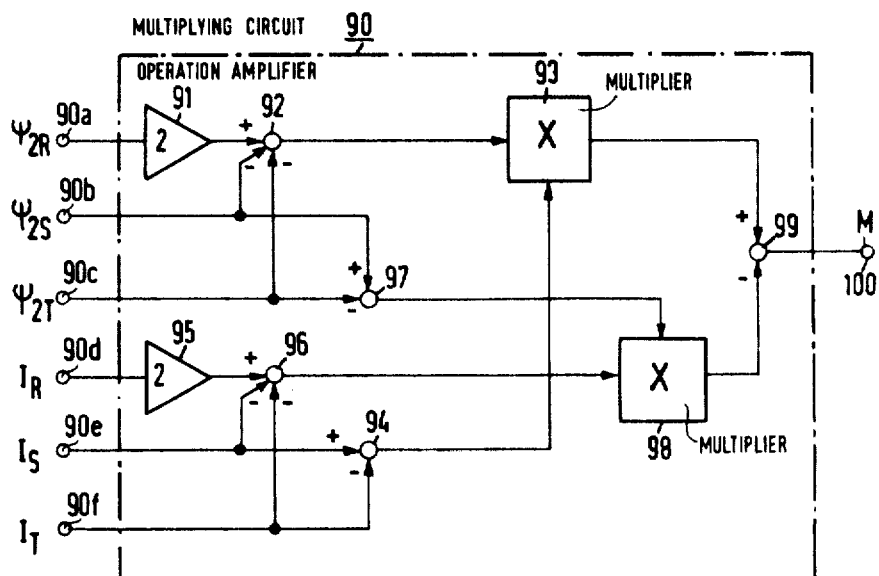
FIG. 10 is a block diagram of a circuit arrangement of the present invention for providing the vectorial product of two rotary vectors.

FIG. 10 is a block diagram of a circuit arrangement for providing the vectorial product of two rotary vectors. The circuit arrangement of FIG. 10 comprises a multiplying circuit 90 utilizing all the phase components of vectors. The multiplying circuit 90 is a three-phase analogy of the multiplying circuit 61 of the embodiment of FIG. 5. The phase values $\psi_{2R}$, $\psi_{2S}$ and $\psi_{2T}$ of the secondary rotary flux vector $\psi_2$, as well as the phase values $I_R$, $I_S$ and $I_T$ of the primary three-phase vector $I_1$, are supplied to input terminals 90a, 90b, 90c, 90d, 90e and 90f, respectively, of the multiplying circuit 90. The circuit 90 provides the vectorial product $\psi_2 I_1$. The input terminal 90a is connected to a summing device 92 via an operation amplifier 91. The input terminal 90b is directly connected to each of the summing device 92 and a summing device 97. The input terminal 90c is directly connected to each of the summing devices 92 and 97. The input terminal 90d is connected to a summing device 96 via an operation amplifier 95. The input terminal 90e is directly connected to each of the summing device 96 and a summing device 94. The input terminal 90f is directly connected to each of the summing devices 96 and 94.

The output of the summing device 92 is connected to an input of a multiplier 93. The output of the summing device 94 is connected to the other input of the multiplier 94. The output of the summing device 97 is connected to an input of a multiplier 98. The output of the summing device 96 is connected to the other input of the multiplier 98. The outputs of the multipliers 93 and 98 are connected to a summing device 99. The phase magnitude $\psi_{2R}$ is amplified by an amplification factor of 2 in the operation amplifier 91 and is subtracted from the sum of the two other phase valves $\psi_{2S}$ and $\psi_{2T}$ in the summing device 92. The resultant magnitude of the summing device 92 is supplied to the multiplier 93. The summing device 94 provides an output signal proportional to the difference between the phase values $I_S$ and $I_T$.

The sum of the phase values $I_S$ and $I_T$ is subtracted from the phase value $I_R$ in the summing device 96, after the phase value $I_R$ is amplified twice in the operation amplifier 95. The resultant magnitude of the summing device 96 is supplied to the multiplier 98. The difference between the two-phase values I5 and I7 is also supplied to the multiplier 98. The outputs of the multipliers 93 and 98 are subtracted from each other in the summing device 99. The resultant magnitude provided by the summing device 99 is the vectorial product and is provided at an output terminal 100 as a magnitude M proportional to the electrical torque of the machine. The same circuit arrangement as that upon which the circuit of FIG. 10 is based may also be utilized to provide the vectorial product described with reference to FIG. 7. This may be provided in three phases between the rotary vectors $\psi_2$ and $d\psi_2/dt$.

Figure 11:
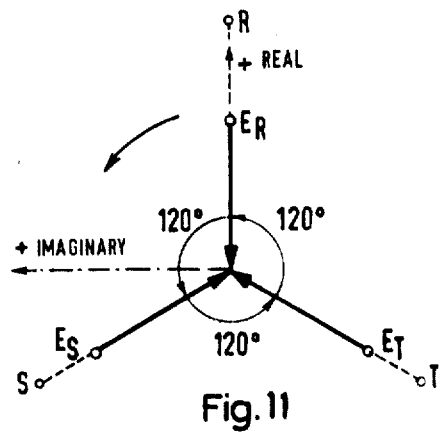
FIG. 11 is a vector diagram illustrating the theory of operation of a circuit providing the phase voltages.

For specified uses related to the speed control of an asynchronous three-phase machine it is preferred not to maintain the flux $\Phi$ constant as in the apparatus of FIG. 1, via the control amplifier or flux regulator 10 (FIG. 1). It is, rather, preferred to regulate the condition $E/\omega_1$ to a constant value. $E = d\Phi/dt$ indicates the induced voltage of the electromotive force and $\omega_1$ indicates the primary frequency. A magnitude proportional to the induced voltage is provided in the aforedescribed manner and will be described again hereinafter. FIG. 11 is a vector diagram illustrating the theory of operation of a circuit providing the phase voltages. FIG. 11 discloses the phase components $E_R$, $E_S$ and $E_T$ of the induced voltage E. The three-phase voltage vector E, which rotates in the direction of the arrow, in FIG. 11, may be described at any given instant, in the illustrated complex and stationary coordinate system, with the assistance of instantaneous magnitudes $E_R$, $E_S$ and $E_T$ of the individual phase voltages, in accordance with the equation $$E = E_R - \tfrac{1}{2}(E_S + E_T) + j(\sqrt{3}/2)(E_S - E_T) \quad (2)$$

In a symmetrical three-phase system, which is free of zero components, the sum of the instantaneous magnitudes of the individual phases is always zero. That is, it is derived from the foregoing Equation (2) which is provided the same as Equation (1).

$$E = (3/2) E_R + j(\sqrt{3}/2)(2E_S + E_R) \quad (3)$$

Figure 12:
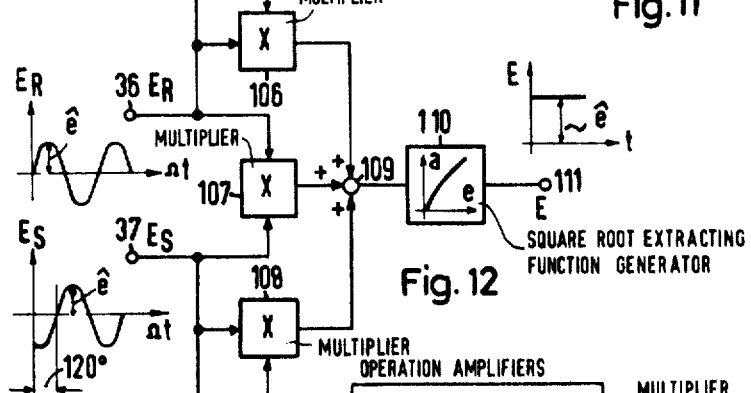
FIG. 12 is a block diagram of a circuit arrangement of the present invention for converting an alternating voltage into a direct voltage proportional to the amplitude of the alternating voltage.

FIG. 12 is a block diagram of a circuit arrangement for converting an alternating voltage into a direct voltage proportional to the amplitude of the alternating voltage. The circuit arrangement of FIG. 12 does not utilize any rectifiers or smoothing components. In FIG. 12, the input terminals 36 and 37, corresponding to the output terminals 36 and 37 of the circuit arrangement 16 of the embodiment of FIG. 4, are supplied with the phase components $E_R$ and $E_S$ of the three-phase voltage vector E. The curve of the three-phase voltage vector E is illustrated for each of the phase components $E_R$ and $E_S$ at the corresponding input terminal 36 and 37. Voltages corresponding to the phase components may be derived from the output terminals 36 and 37 of FIG. 4.

As illustrated in the curves at the input terminals in FIG. 12, $$E_R = \hat{e} \sin \omega t$$

three multipliers 106, 107 and 108 are connected to the input terminals 36 and 37. The multiplier 106 multiplies the input signal at the input terminal 36 by itself. The multiplier 107 multiplies the input signals at the terminals 36 and 37 by each other. The multiplier 108 multiplies the input signal at the input terminal 37 by itself. The outputs of the multipliers 106, 107 and 108 are supplied to a summing device 109. The output magnitude provided by the summing device 109 is proportional to the sum of the squares of the three-phase voltage vector E, as derived from Equation (3).

The output magnitude of the summing device 109 is supplied to a square root extracting function generator 110. The symbol for the square root extracting function generator 110 includes its curve $a = \sqrt{e}$ indicating the variation of the output voltage $a$ with the input voltage $e$. The function generator may be provided, in a known manner, by threshold diodes biased at variable direct voltages. An output magnitude E is provided at an output terminal 111. The output magnitude E is proportional to the sum of the three-phase voltage vector. The curve of the output magnitude E is illustrated at the output terminal 111. This is a true direct voltage having a magnitude proportional to the amplitude $\hat{e}$ of the phase voltages $E_R$ and $E_S$.

Figure 13:
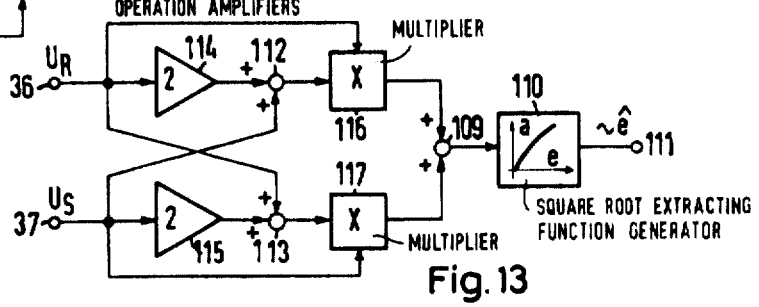
FIG. 13 is a block diagram of another embodiment of the circuit arrangement of FIG. 12.

FIG. 13 is a block diagram of another embodiment of the measurand converter of the present invention. The circuit arrangement of FIG. 13 comprises two summing devices 112 and 113. The input terminal 36 is connected to the summing device 112 via an operation amplifier 114, directly to a multiplier 116 and directly to the summing device 113. The input terminal 37 is connected to the summing device 113 via an operation amplifier 115, directly to the multiplier 117 and directly to the summing device 112. The resultant magnitude of the summing device 112 is supplied to the multiplier 116 and the resultant magnitude of the summing device 113 is supplied to the multiplier 117. The output signals of the two multipliers 116 and 117 are added in a summing device 109. The summing device 109 provides an output magnitude which is supplied to the square root extracting function generator 110 of FIG. 12. The output magnitude is proportional to the sum of squares of the three-phase voltage vector E. The advantage of the embodiment of FIG. 13 over that of FIG. 12 is that the circuit of FIG. 13 utilizes only two multipliers as compared to the three multipliers utilized by the circuit of FIG. 12.

Figure 14:
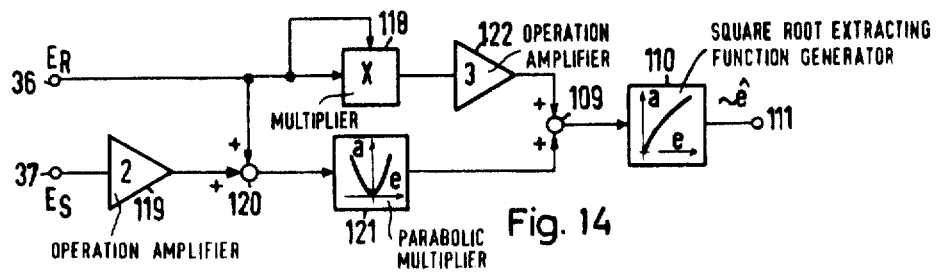
FIG. 14 is a block diagram of still another embodiment of the circuit arrangement of FIG. 12.

FIG. 14 is a block diagram of another embodiment of the measurand converter of the present invention. In FIG. 14 the phase voltage $E_R$ is supplied via the input terminal 36 to both inputs of a multiplier 118 and to a summing device 120. The multiplier 118 thus functions to multiply the phase voltage $E_R$ by itself. The phase voltage $E_S$ is supplied to the summing device 120 via an amplifier 119 which has an amplification factor of 2. The output magnitude of the summing device 120 is supplied to a square function generator or parabolic multiplier 121. The curve of the output magnitude $a$ and the input magnitude $e$ of the parabolic multiplier 121 is graphically presented in its symbol as equation $a = e^2$.

The output magnitude of the multiplier 118 is amplified three times by an operation amplifier 122 and is supplied to the summing device 109. The output of the parabolic multiplier 121 is also supplied to the summing device 109. The summing device 109 adds the outputs of the operation amplifier 122 and the parabolic multiplier 121 with variable weights and provides an output magnitude which is supplied to the square root extracting function generator 110. The output magnitude of the summing device 109 is proportional to the sum of the three-phase voltage vector and is therefore proportional to the $\hat{e}$ of the phase voltages $E_R$ and $E_S$. The multiplier 118 may be replaced in FIG. 14 by a square function generator corresponding to the square function generator 121. When the square function generator 121 comprises a parabolic multiplier, two less square function generators are utilized in the circuit arrangement of FIG. 14 than in the previous circuits.

Figure 15:
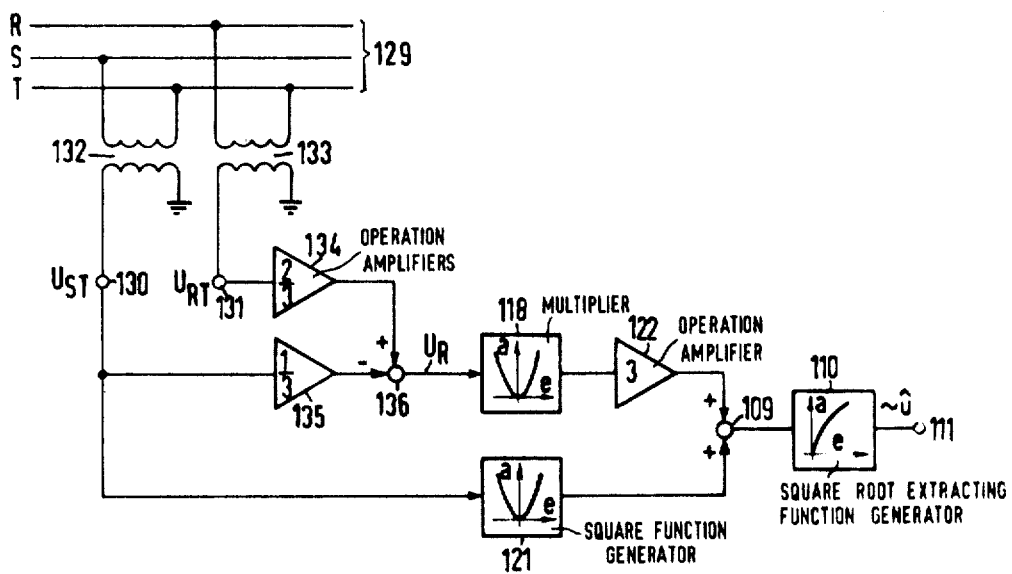
FIG. 15 is a block d6agram of an embodiment of a circuit arrangement of the present invention for converting an alternating voltage of a multiphase symmetrical three-phase voltage system to a direct voltage.

FIG. 15 is a block diagram of an embodiment of a circuit arrangement of the present invention for converting an alternating voltage of a multiphase symmetrical three-phase voltage system to a direct voltage which may be utilized when the three-phase voltage system, comprising phase voltages $U_R$, $U_S$ and $U_T$, has no zero conductor $M_p$, or one which is not easily accessible. The circuit arrangement of FIG. 15 comprises two transformers 132 and 133 coupled to the line voltages $U_{ST}$ and $U_{RT}$.

One end of the secondary winding of each of the transformers 132 and 133 is connected to ground, the other end of the secondary winding of the transformer 132 is connected to an input terminal 130 and the other end of the secondary winding of the transformer 133 is connected to an input terminal 131. The input terminal 130 is connected directly to the square function generator 121 and is connected to a summing device 136 via an operation amplifier 135. The input terminal 131 is connected to the summing device 136 via an operation amplifier 134. The summing device 136 provides an output magnitude proportional to the phase voltage $U_R$ and is supplied to the multiplier 118 which may comprise a square function generator, as in FIG. 14. Since the square function generator 121 is directly supplied with the line voltage $U_{ST}$, a direct voltage appears at the output terminal 111 of FIG. 15. The output voltage at the terminal 111 is proportional to the amplitude $u$ of the phase voltage $U_R$. It is essential to for the present invention that the direct voltage magnitude provided at the output terminal 111 (FIGS. 12, 13, 14 and 15) and at the output terminal 6 (FIGS. 4 and 4b) follows, without delay, each amplitude variation of the same alternating voltage in the three-phase current system.

If the circuit arrangements of FIGS. 12 and 15 are energized, for example, by the output voltages of a three-phase tachometer coupled to a rotating shaft, a direct voltage proportional to the speed of the shaft may be provided at any desired instant. This is a requirement which could not be attained with any known, considerably more expensive, DC tachometer, dynamo machines. The use of such machines always involves a delay in the response due to smoothing operations related to the high quality control or regulation of the output voltages.

The circuitries utilized in each of the blocks of the drawings are well known in the art. Each of these blocks constitutes an analog computer building block, which is known in the art and which is commercially available. Thus, for example, the square root extracting function generators 52 and 110 are described on page 52, sections II.24 and II.25, more specifically in FIG. 2.25(a), of the "Applications Manual for Computing Amplifiers for Modelling Measuring Manipulating & Much Else" by Philbrick Researches, Inc., 1966. The square root extracting function generator is a conventional operation amplifier and comprises the Philbrick plug-in unit PSQ-P/N.

The square function generator 51, 86, 87 and 121 is described on page 52, section II.25 of the aforedescribed "Applications Manual for Computing Amplifiers for Modelling Measuring Manipulating & Much Else" and is also available as the Philbrick plug-in unit PSQ-P/N. The square function generator is known as a squarer.

The parabolic multiplier 121 is an embodiment of the multiplier described on page 55, section II.32, of the aforedescribed "Applications Manual for Computing Amplifiers for Modelling Measuring Manipulating & Much Else," and is known as a quarter-square multiplier. The parabolic multiplier 121 is also shown on pages 92 and 93 of *Analogrechnen*, or *Analog Computation*, by Giloi and Lauber, Springer-Verlag 1963. The parabolic multiplier is available as building block Q3M1P, manufactured by Philbrick/Nexus Research of Dedham, Massachusetts.

The divider 71 is described on page 55, section II.33 of the aforedescribed "Applications Manual for Computing Amplifiers for Modelling Measuring Manipulating & Much Else." The divider is available as building block Q3M1P.

The integrator amplifier 42 and 43 is described on page 44, section II.11 of the aforedescribed "Applications Manual for Computing Amplifiers for Modelling Measuring Manipulating & Much Else." The integrator amplifier is known as an augmenting integrator and is an amplifier having PI-behavior, which is a proportional positive reset control action.

The operation amplifier 20, 21, 22, 23, 28, 29, 30, 31, 53, 54, 55, 56, 16a, 16b, 16c, 16d, 16e, 16f, 16g, 16h, 69, 72, 50, 73, 84, 85, 91, 95, 114, 115, 119, 122, 134 and 135 is an operational amplifier and is described on page 31, section I.38 of the aforedescribed "Applications Manual for Computing Amplifiers for Modelling Measuring Manipulating & Much Else." The operation amplifier is available as Philbrick building block P25A.

While the invention has been described by means of specific examples and in specific embodiments, I do not wish to be limited thereto, for obvious modifications will occur to those skilled in the art without departing from the spirit and scope of the invention.

I claim:

1. Apparatus for providing the pilot values of characteristics of an asynchronous three-phase machine from its primary current and voltage, said apparatus comprising current transformer means connected in at least two leads of said machine, said current transformer means comprising a pair of current transformers each having a primary winding connected in a corresponding one of the leads of said machine and a secondary winding, an ohmic resistance and an inductive reactance connected in series circuit arrangement across each of said secondary windings for providing voltages proportional to the phase current and its differential quotient, integrator means, and coupling means for applying said voltages and the subordinated phase voltage to said integrator means to provide at said integrator means signals having instantaneous magnitudes proportional to flux components of voltages induced in two winding axes spaced from each other by 120°; multiplying means having output means for producing a signal having a magnitude proportional to the sum of the squares of the rotary flux vectors and the induced three-phase voltage vector by the signals provided at said integrator means, said multiplying means multiplying each signal magnitude by itself as well as by the other; and summing means connected to the output means of said multiplying means.

2. Apparatus as claimed in claim 1, wherein said multiplying means comprises a pair of multipliers each having a first input and a second input, first input means connected to the first inputs of said multipliers for supplying a first signal having a magnitude proportional to one of said flux components, and second input means connected to the second inputs of said multipliers for supplying a second signal having a magnitude proportional to the sum of the magnitude of said first signal and a magnitude proportional to the other of said flux components.

3. Apparatus as claimed in claim 1, wherein said multiplying means comprises a pair of parabolic multipliers each having a first input and a second input, input means connected to the first and second inputs of one of said multipliers for supplying a signal having a magnitude proportional to one of said flux components, and input means connected to the first and second inputs of the other of said multipliers for supplying a signal having a magnitude proportional to the other of said flux components.

4. Apparatus as claimed in claim 1, further comprising a square root extracting function generator having an input, and wherein said summing means has an output connected to the input of said function generator.

5. Apparatus as claimed in claim 3, wherein each of said multipliers comprises a square function generator having a plurality of biased threshold diodes.

6. Apparatus as claimed in claim 1, further comprising a pair of proportion amplifiers, and wherein said integrator means comprises a pair of integrators each coupled to the secondary winding of a corresponding one of said current transformers, each of said proportion amplifiers being connected across a corresponding one of said integrators in feedback relation for suppressing direct current.

7. Apparatus as claimed in claim 6, wherein the quotient of the double integral time of said integrators and the integral time of said proportion amplifiers are equal to or less than the proportional amplification thereof.

8. Apparatus as claimed in claim 7, wherein the proportional amplification is as small as possible.

9. Apparatus for providing the pilot values of characteristics of an asynchronous three-phase machine from the primary current and voltage of converter means utilized to measure the machine, said apparatus comprising multiplying means having output means for producing a signal having a magnitude proportional to the sum of the squares of the rotary flux vectors and the induced three-phase voltage vector by first producing signals having instantaneous magnitudes proportional to flux components of voltages induced in two winding axes spaced from each other by 120°, said multiplying means multiplying each signal magnitude by itself as well as by the other, said multiplying means comprising a pair of multipliers each having a first input and a second input and an output providing a signal having a magnitude proportional to the instantaneous torque of said machine, input means connected to the first inputs of said multipliers for supplying to said first inputs a magnitude proportional to the instantaneous value of the secondary flux or the main flux of one phase, input means connected to the second inputs of said multipliers for supplying to said second inputs a magnitude proportional to the primary current of the other phase and a summary device connected to the outputs of said multipliers for providing the difference between the output signals of said multipliers; and summing means connected to the output means of said multiplying means.

10. Apparatus as claimed in claim 9, further comprising divider means having first and second inputs and an output for providing a magnitude proportional to the slip frequency of said machine, the first input of said divider means being connected to said summing device for providing a dividend to said divider means, and additional input means connected to the second input of said divider means for supplying to said divider means a divisor having a magnitude proportional to the sum of the squares of the secondary rotary flux of said machine.

11. Apparatus as claimed in claim 10, further comprising an additional multiplier having first and second inputs and an output for producing a magnitude proportional to the torque of said machine, the output of said divider means being connected to the first input of said additional multiplier, and further input means connected to the second input of said additional multiplier for supplying to said additional multiplier a signal having a magnitude proportional to the sum of the squares of the main rotary flux of said machine.

12. Apparatus for providing the pilot values of characteristics of an asynchronous three-phase machine from the primary current and voltage, said apparatus comprising multiplying means having output means for producing a signal having a magnitude proportional to the sum of the squares of the rotary flux vectors and the induced three-phase voltage vector by first producing signals having instantaneous magnitudes proportional to flux components of voltages induced in two winding axes spaced from each other by 120°, said multiplying means multiplying each signal magnitude by itself as well as by the other, said multiplying means comprising a pair of multipliers each having a first input and a second input and an output for producing a signal having a magnitude proportional to the instantaneous torque of said machine, a summing device connected to the outputs of said multipliers for providing the difference of said outputs, input means connected to the first inputs of said multipliers for supplying to said first inputs the difference between instantaneous magnitudes of the secondary flux of said machine and magnitudes proportional to the primary currents of two phases and input means connected to the second inputs of said multipliers for supplying to said second inputs the sum of said primary current proportional magnitudes minus twice a magnitude proportional to the secondary flux or primary current of the third phase of said machine; and summing means connected to the output means of said multiplying means.

13. Apparatus for providing the pilot values of characteristics of an asynchronous three-phase machine from the primary current and voltage of converter means utilized to measure the machine, said apparatus comprising multiplying means having output means for producing a signal having a magnitude proportional to the sum of the squares of the rotary flux vectors and the induced three-phase voltage vector by first producing signals having instantaneous magnitudes proportional to flux components of voltages induced in two winding axes spaced from each other by 120°, said multiplying means multiplying each signal magnitude by itself as well as by the other, said multiplying means comprising a pair of multipliers each having a first pair of inputs and a second pair of inputs and an output for providing a signal having a magnitude proportional to the instantaneous rotary speed of said machine, input means connected to the first pair of inputs of said multipliers for supplying to said first pair of inputs a magnitude proportional to the instantaneous magnitude of the secondary flux of one phase of said machine, input means connected to the second pair of inputs of said multipliers for supplying to said second pair of inputs a magnitude proportional to the derivatives of the other phases of said machine relative to time, a first operation amplifier, a second operation amplifier, a summing device connected to the output of one of said multipliers via the first amplifier and connected to the output of the other of said multipliers via the second amplifier in a manner whereby the outputs of said multipliers are subtractively supplied to said summing device and a magnitude proportional to the torque of said machine is supplied to said summing device, a divider having first and second inputs and an output, the output of said summing device being directly connected to the first input of said divider for supplying the dividend to said divider, and additional input means connected to the second input of said divider for supplying to said divider a divisor having a magnitude proportional to the sum of the squares of the secondary rotary flux of said machine; and summing means connected to the output means of said multiplying means.